(12) United States Patent
Chida et al.

(10) Patent No.: US 8,267,425 B2
(45) Date of Patent: Sep. 18, 2012

(54) AIR BAG SYSTEM FOR VEHICLE

(75) Inventors: Yusuke Chida, Wako (JP); Makoto Nagai, Wako (JP); Hiroyuki Nozaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 134 days.

(21) Appl. No.: 12/751,420

(22) Filed: Mar. 31, 2010

(65) Prior Publication Data

US 2010/0253054 A1 Oct. 7, 2010

(30) Foreign Application Priority Data

Apr. 1, 2009 (JP) ................................ 2009-088851

(51) Int. Cl.
*B60R 21/239* (2006.01)
*B60R 21/231* (2011.01)
*B60R 21/2334* (2011.01)
*B60R 21/2338* (2011.01)
*B60R 21/16* (2006.01)
*B60R 21/26* (2011.01)
*B60R 21/203* (2006.01)

(52) U.S. Cl. ..................... 280/736; 280/739; 280/743.1; 280/743.2; 280/731

(58) Field of Classification Search .................. 280/739, 280/743.1, 731, 736, 743.2
See application file for complete search history.

(56) References Cited

U.S. PATENT DOCUMENTS

| 6,135,490 A * | 10/2000 | Spary ........................ 280/730.2 |
| 6,832,778 B2 * | 12/2004 | Pinsenschaum et al. ..... 280/739 |
| 6,932,385 B2 * | 8/2005 | Hawthorn et al. ............ 280/739 |
| 7,261,319 B2 * | 8/2007 | DePottey et al. ............. 280/739 |
| 7,275,762 B2 * | 10/2007 | Miyata ....................... 280/743.2 |
| 7,401,811 B2 * | 7/2008 | Nagai et al. ................ 280/743.1 |
| 7,458,607 B2 * | 12/2008 | Abe .............................. 280/739 |
| 7,568,731 B2 * | 8/2009 | Miyata ....................... 280/743.2 |
| 7,581,755 B2 * | 9/2009 | Nagai et al. ................ 280/743.1 |
| 7,658,407 B2 * | 2/2010 | Ford et al. ..................... 280/739 |
| 7,726,685 B2 * | 6/2010 | Abe et al. ...................... 280/736 |
| 7,931,297 B2 * | 4/2011 | Abe et al. ...................... 280/739 |
| 2011/0140400 A1 * | 6/2011 | Chida et al. .................. 280/741 |

FOREIGN PATENT DOCUMENTS

| JP | 2005-199987 | 7/2005 |
| JP | 2006-264662 | 10/2006 |
| JP | 2008-179337 | 8/2008 |

* cited by examiner

*Primary Examiner* — Joseph Rocca
*Assistant Examiner* — Joselynn Y Sliteris
(74) *Attorney, Agent, or Firm* — Rankin, Hill & Clark LLP

(57) ABSTRACT

An air bag system for a vehicle including an air bag in a folded state and installed in a vehicle. The air bag is inflated and expanded by gas from an inflator, which introduces gas into the air bag. A vent hole is formed in at least one base fabric piece of the air bag so as to establish a communication path between an inside and an outside of the air bag through which gas may be discharged from the inside toward the outside of the air bag. A blocking member is supported on the base fabric piece to block up the vent hole. A guide portion is provided to slidably support the blocking member and to restrict the position of the blocking member relative to the vent hole. A sliding resistance increasing portion is provided on at least either one of the guide portion and the blocking member, so as to increase a sliding resistance between the guide portion and the blocking member when the blocking member slides.

15 Claims, 15 Drawing Sheets

VIEW ON ARROW X1

LEFT ←→ RIGHT

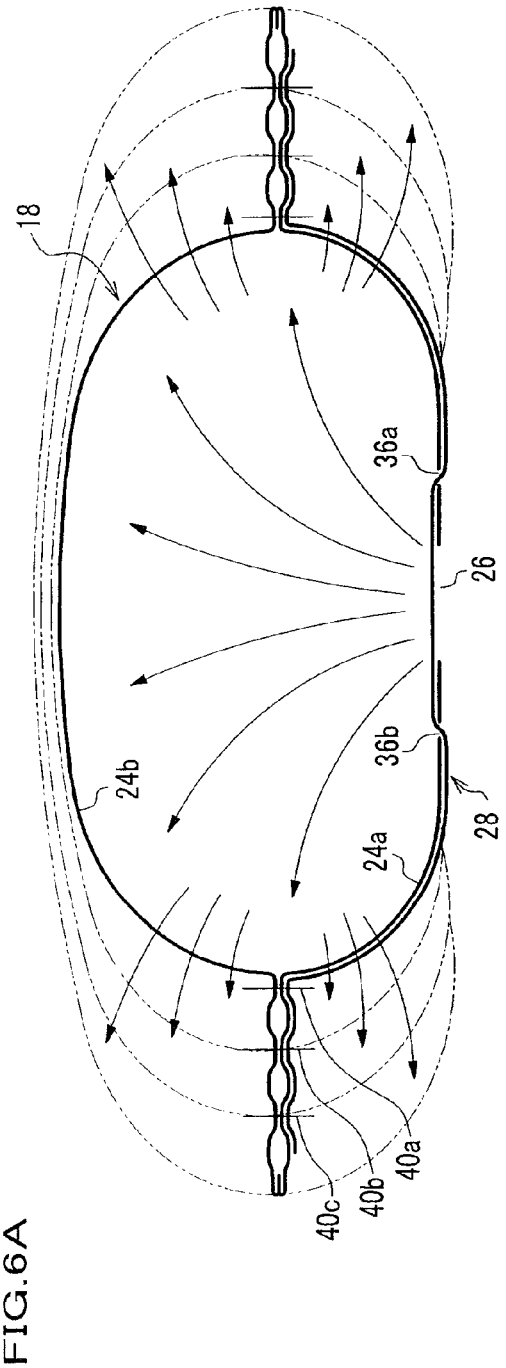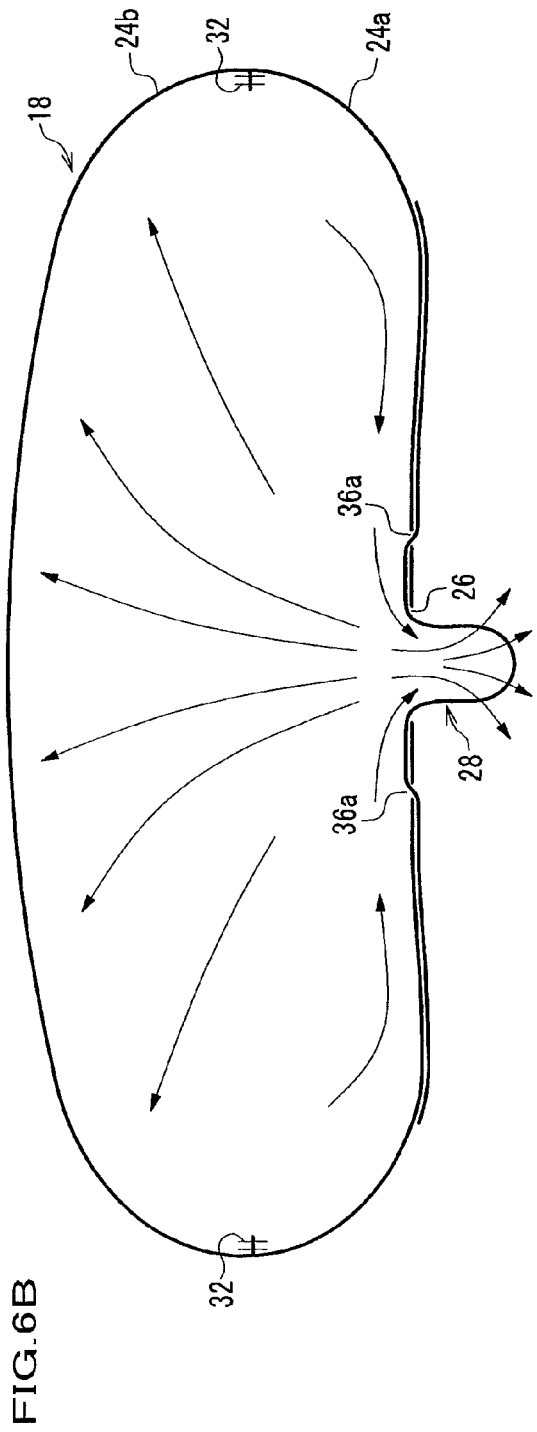
FIG.6A
FIG.6B

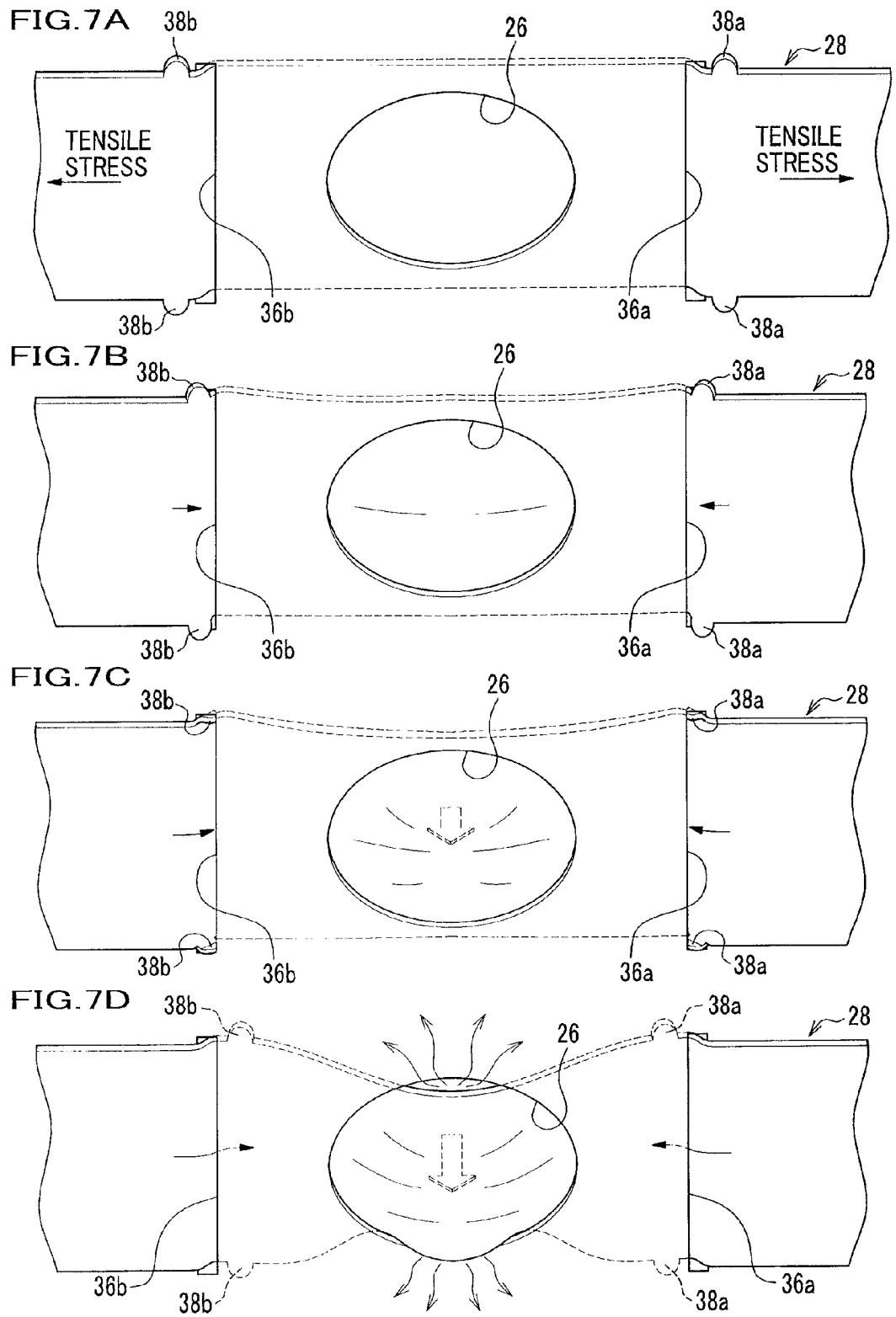

VIEW ON ARROW X1

LEFT ←→ RIGHT

WIDTH DIRECTION

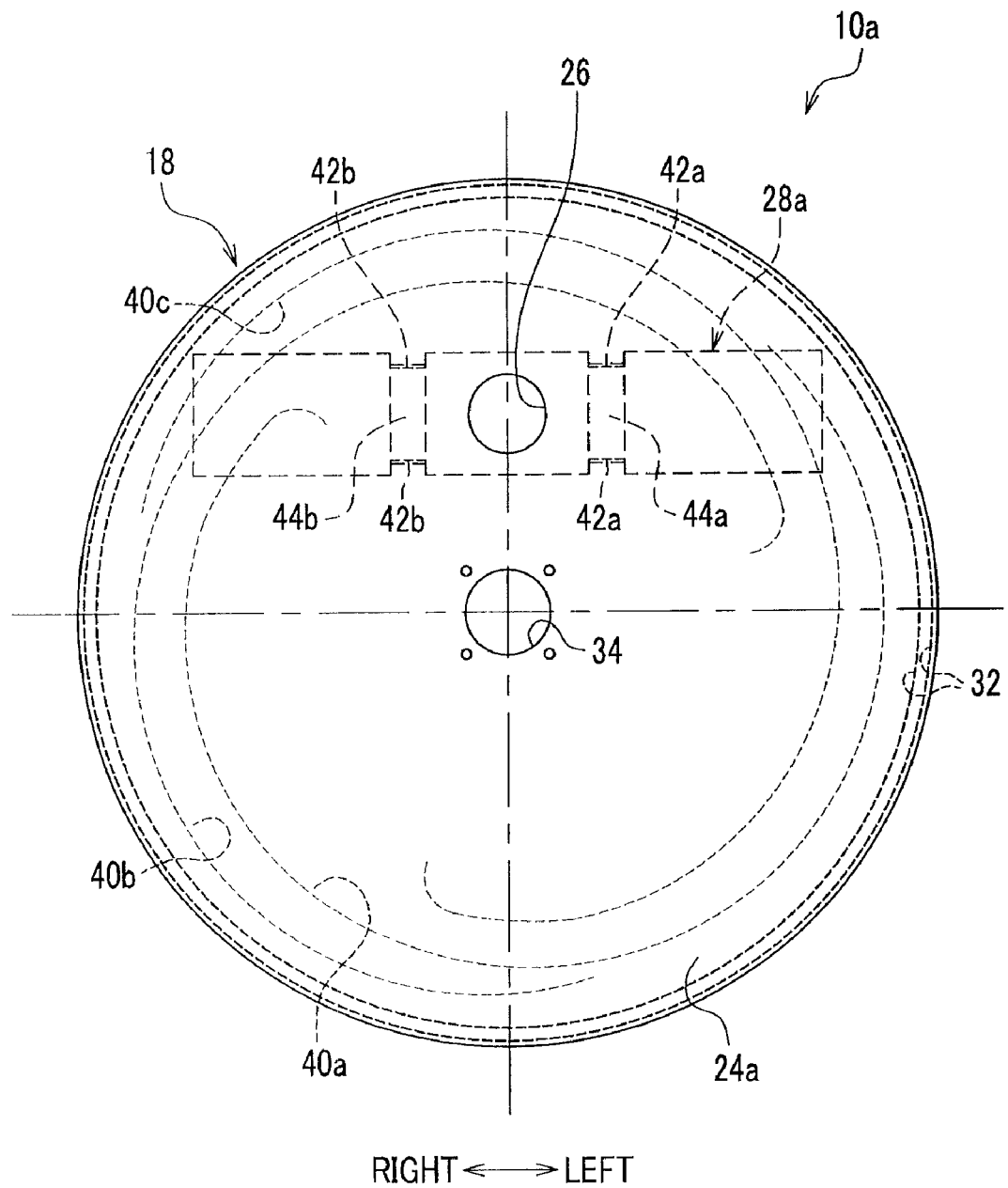

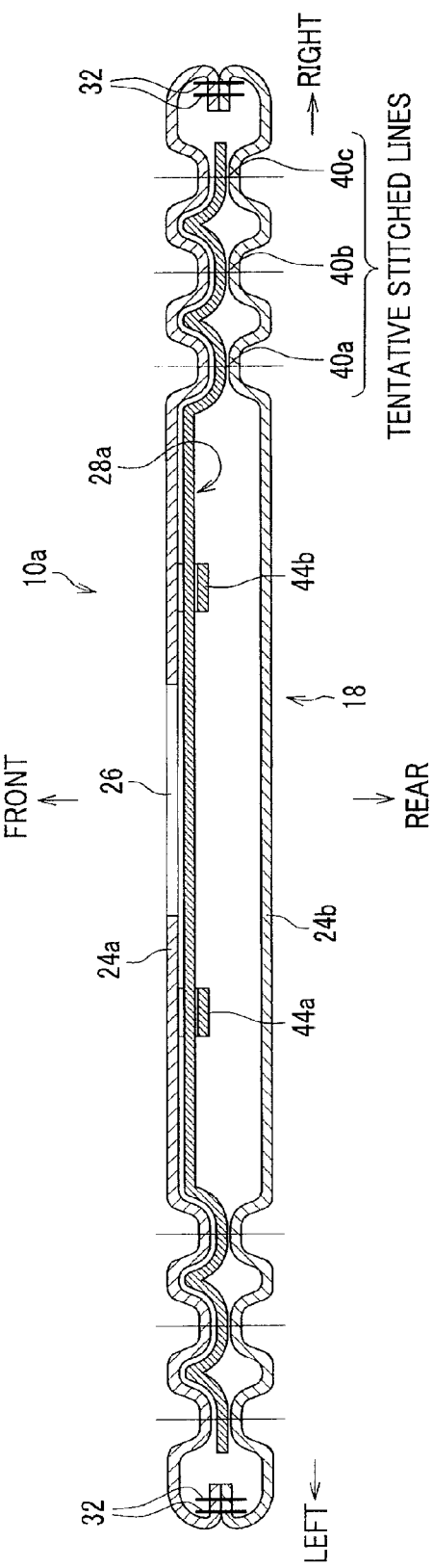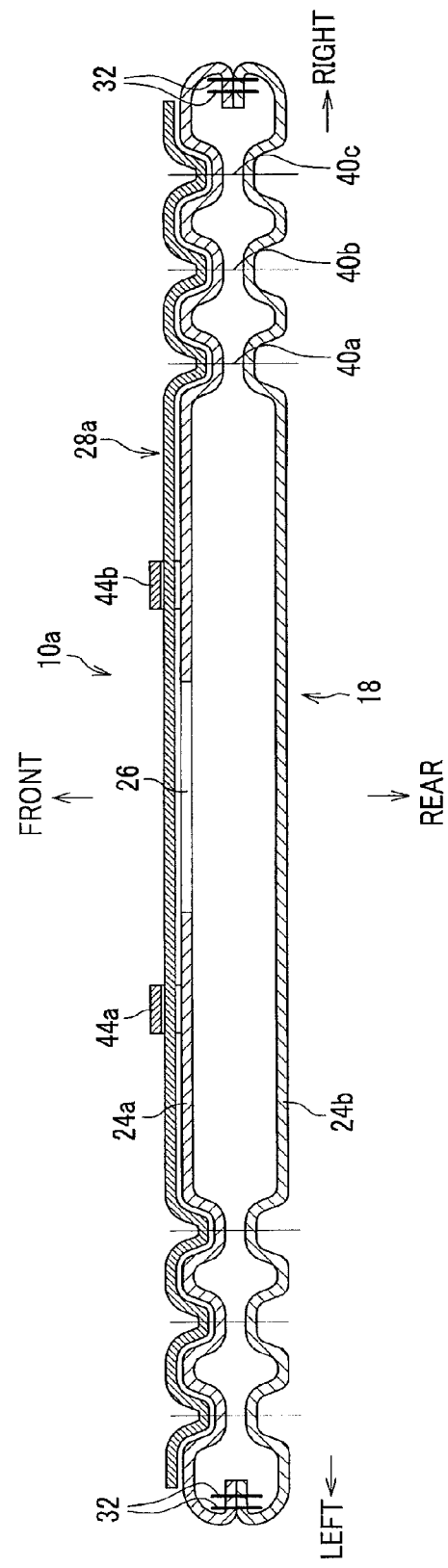

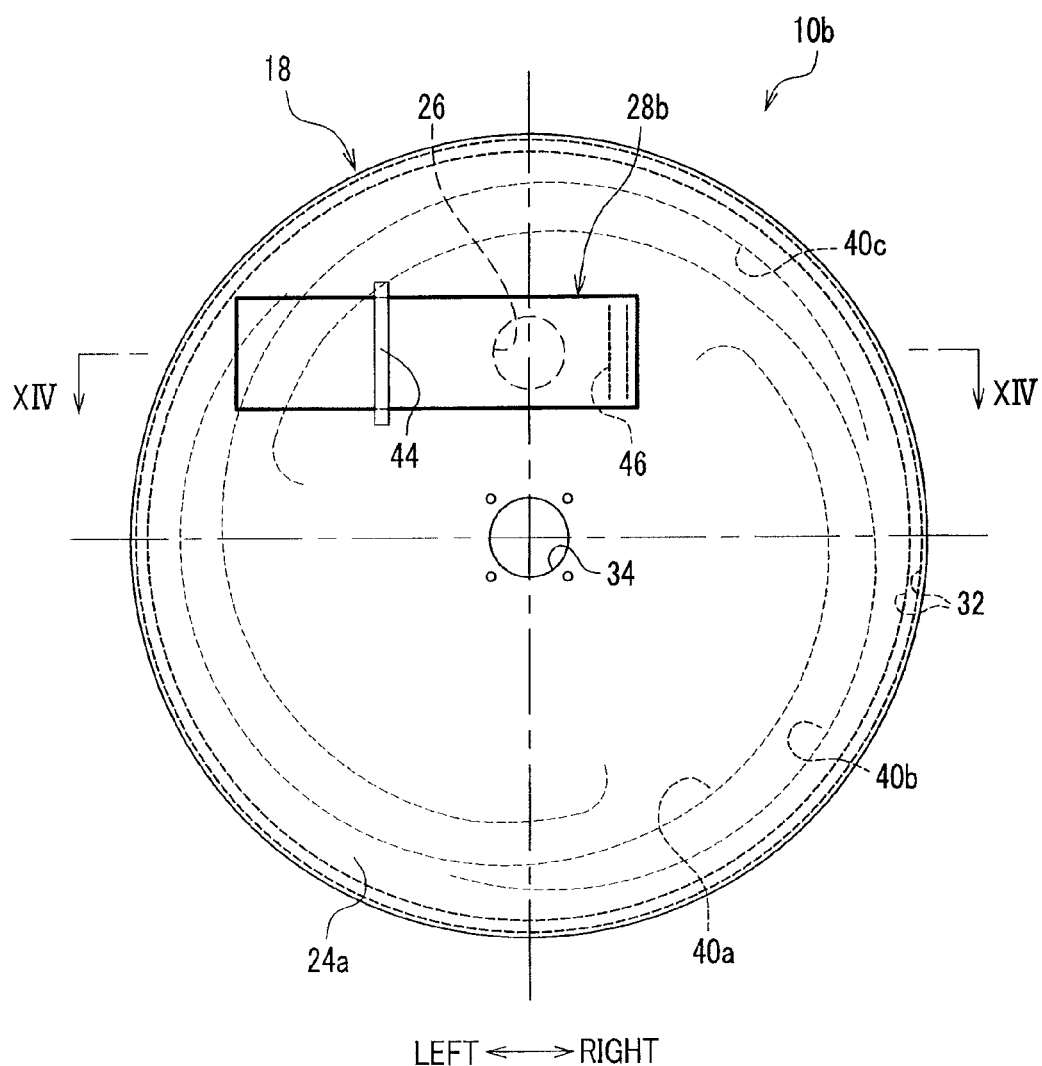

VIEW ON ARROW X2

RIGHT ←——→ LEFT

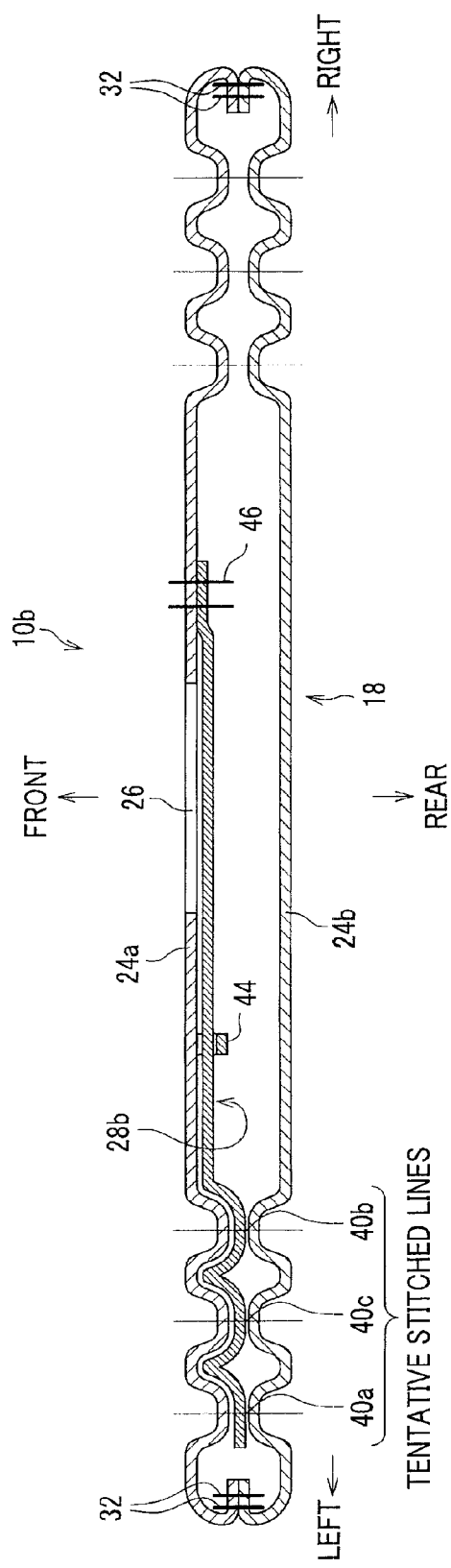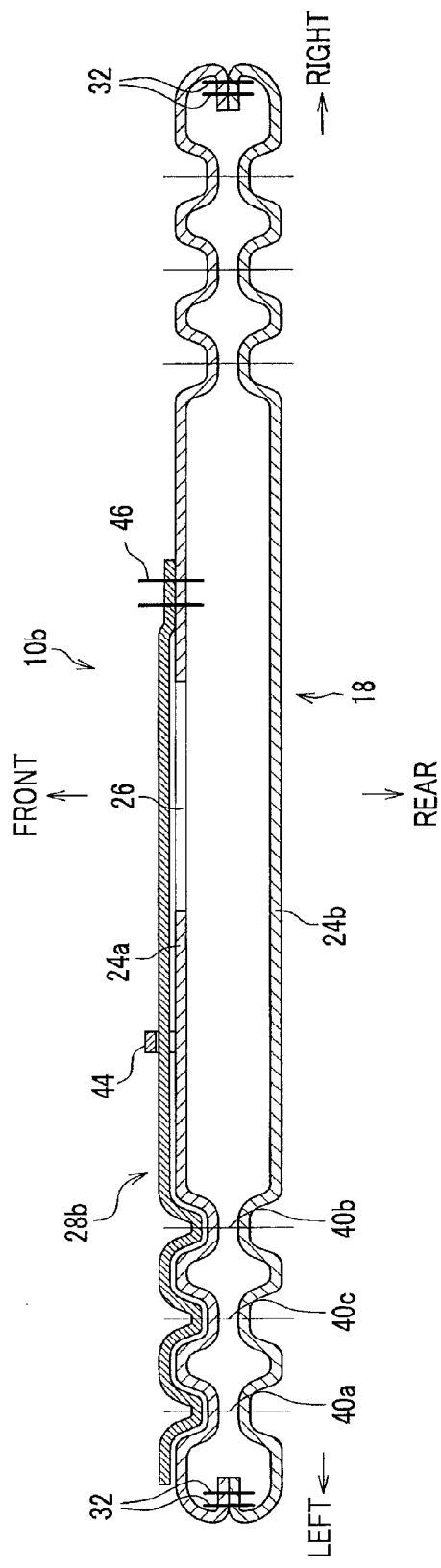

AIR BAG SYSTEM FOR VEHICLE

CROSS-REFERENCE TO RELATED APPLICATION

This application claims the foreign priority benefit under 35 U.S.C. §119 of Japanese Patent Application No. 2009-088851 filed on Apr. 1, 2009, the disclosure of which is incorporated herein by reference.

BACKGROUND OF THE INVENTION

1. Field of the Invention

The present invention relates to an air bag system for a vehicle in which there is provided a vent hole in one of base fabric pieces that is a part of an air bag, so that gas flows from the vent hole toward the exterior of the air bag during the expansion of the air bag.

2. Description of the Related Art

There has been known an air bag that inflates and expands by gas supply from an inflator at the time of a collision of a vehicle, thereby to protect an occupant. Such an air bag is provided with a vent hole for discharging gas at an excessive pressure to the exterior of the air bag so as to prevent an excessive rise of gas pressure in the air bag.

If such a vent hole is unblocked at the very initial state of expansion of the air bag, gas supplied from an inflator is leaked from the vent hole, which causes delay of the initial rise of the inner pressure of the air bag. Hence, the vent hole is designed to open on the way of expanding the air bag.

Regarding the air bag with such a vent hole, JP2005-199987A, for example, discloses that there is provided a vent hole cover to block up the vent hole, and one end of the vent hole cover is fixed in the vicinity of the center portion of the second base fabric piece, and the other end thereof is stitched in the vicinity of the outer circumference of the air bag, together with the stitched portion of the first and second base fabric pieces, so as to control the timing when the vent hole comes unblocked.

However, when the vent hole cover stitched in the vicinity of the outer circumference of the air bag comes released into the free state, the vent hole cover instantaneously comes apart from the vent hole, so that gas leakage from a gap between the vent hole cover and the vent hole may occur.

Specifically, before the vent hole cover comes apart from the stitched portion of the vent hole cover so as to unblock the vent hole, that is, before the inner pressure of the air bag is released during the expansion of the air bag, the vent hole cover comes apart from the vent hole just for a moment so that gas in the air bag may leak to the exterior.

To address the above problem, the present invention has an object to provide an air bag system for a vehicle that can maintain the blocking state of a vent hole after a blocking member for blocking up the vent hole comes in the free state and before the inner pressure of an air bag is released, so as to prevent instantaneous gas leakage.

SUMMARY OF THE INVENTION

In order to realize the above object, the present invention provides an air bag system for a vehicle including an air bag in a folded state and installed in a vehicle, the air bag inflating and expanding by a gas supply, and an inflator introducing gas into the air bag. The air bag system further includes a vent hole provided on at least one base fabric piece of the air bag so as to establish a communication between an inside and an outside of the air bag, and discharge gas from the inside toward the outside of the air bag; a blocking member supported on the base fabric piece to block up the vent hole; a guide portion for slidably supporting the blocking member and restricting the position of the blocking member relative to the vent hole; and a sliding resistance increasing portion provided on at least either one of the guide portion and the blocking member, so as to increase a sliding resistance between the guide portion and the blocking member when the blocking member slides.

The present invention provides the sliding resistance increasing portion on at least one of the guide portion and the blocking portion, so as to increase the sliding resistance between the guide portion and the blocking member when the blocking member slides to release the inner pressure of the air bag. Accordingly, the blocking member is restricted to come apart from the vent hole just for a moment, so that the blocked state of the vent hole can be maintained to prevent the instantaneous gas leakage and make moderate the change in the inner pressure of the air bag.

As described above, the present invention slightly extends the time period until the inner pressure in the air bag is released right after the blocking member 28 comes in the free state, so that the time while an occupant is being held by the air bag can be longer; accordingly the occupant protection effect can be enhanced much more.

In the present invention, the sliding resistance increasing portion includes a narrower portion having a relatively narrower distance between the blocking member and the guide portion, or a step portion formed in the direction vertical to the sliding direction of the blocking member. Accordingly, the present invention employs a simple structure to easily increase the sliding resistance between the guide portion and the blocking member, and also to prevent the sliding blocking member from coming off from the vent hole.

Projections or rectangular recess portions are formed on the upper and lower edges of the blocking member of a web-like body in a laterally long rectangular shape as the step portions formed at appropriate positions vertical to the sliding direction of the blocking member, and the projections and the rectangular recess portions are engaged with the guide portions, so as to securely cause the sliding resistance, thereby realizing the stable sliding restrict effect of the blocking member.

In the present invention, at least one end of the blocking member is tentatively or temporarily stitched onto the base fabric piece by at least one tentative or temporary stitched line to be broken off, and the guide portion is provided between the one end of the blocking member and the vent hole, and the tentative or temporary stitched line is broken off during expansion of the air bag, so as to release the blocking member from its restricted state.

According to the present invention, when the tentative stitched line is broken off, and the restricted state of the one end of the blocking member is released into the free state, the present invention restricts an instantaneous displacement of the one end of the blocking member that moves back to the vent hole because the blocking member stretched by the tensile stress shrinks, so that the decrease in the pressure of the air bag can be prevented to moderate the change in the inner pressure of the air bag.

In addition, according to the present invention, a plurality of the guide portions and a plurality of the sliding resistance increasing portions may be provided, between which the vent hole may be formed.

Furthermore, according to the present invention, both ends of the blocking member may be stitched onto the base fabric piece by the tentative stitched line, respectively, so that the blocking member is supported onto the base fabric piece, thereby to block up the vent hole. The guide portions are provided between each end of the blocking member and the vent holr, respectively, and the tentative stitched line is broken off during the air bag expansion, thereby releasing the blocking member from the restricted state into the free state thereof.

According to the present invention, since a plurality of the guide portions are provided between which the vent hole is positioned, the blocking member can slide easily when the blocking member is released during the air bag expansion from the restricted state into the free state, which may ensure the smooth unblocking operation of the blocking member for blocking up the vent hole, but at the same time, the decrease in the inner pressure of the air bag may be encouraged.

To counter this, the present invention provides a plurality of the sliding resistance increasing portions, by which the sliding operation of the blocking member is controlled, so that the flexibility of the blocking member movement can be ensured as well as the inner pressure retaining time can be extended.

Other features and advantages of the present invention will become more apparent from the following detailed description of the invention when taken in conjunction with the accompanying exemplary drawings.

BRIEF DESCRIPTION OF THE DRAWINGS

FIG. 6A is a view explaining the operation of the air bag, showing that the air bag is on the way of expansion, where the air bag expansion is restricted by first to third tentative stitched lines.

FIG. 6B is a view explaining the operation of the air bag, showing that the air bag is at the terminal stage of expansion, where, after the first to third tentative stitched lines are broken off, the blocking member unblocks the vent hole to release gas.

FIG. 7A is a partially broken perspective view showing that the blocking member is in the restricted and tense state.

FIG. 7B is a partially broken perspective view showing that the blocking member is in the restricted and tense state.

FIG. 7B is a partially broken perspective view showing that the blocking member is released from the restricted state and becomes in the free state.

FIG. 7C is a partially broken perspective view showing the state where pairs of the projections engage with slits, respectively.

FIG. 7D is a partially broken perspective view showing that the blocking member is pushed outward from the vent hole so that the vent hole becomes in the released state.

FIG. 10 is a view corresponding to FIG. 4, showing the air bag system according to the first variation of the embodiment of the present invention.

FIG. 11A is an enlarged longitudinal sectional view along a line XI- XI of FIG. 9A.

FIG. 11B is an enlarged longitudinal sectional view of an applied example of the air bag system according to the first variation of the embodiment.

FIG. 12 is a view corresponding to FIG. 3, showing the air bag system according to the second variation of the embodiment of the present invention.

FIG. 14A is an enlarged longitudinal sectional view along a line XIV- XIV of FIG. 12.

FIG. 14B is an enlarged longitudinal sectional view of an applied example of the air bag system according to the first variation of the embodiment.

DETAILED DESCRIPTION OF THE PREFERRED EMBODIMENTS

Figure 1:
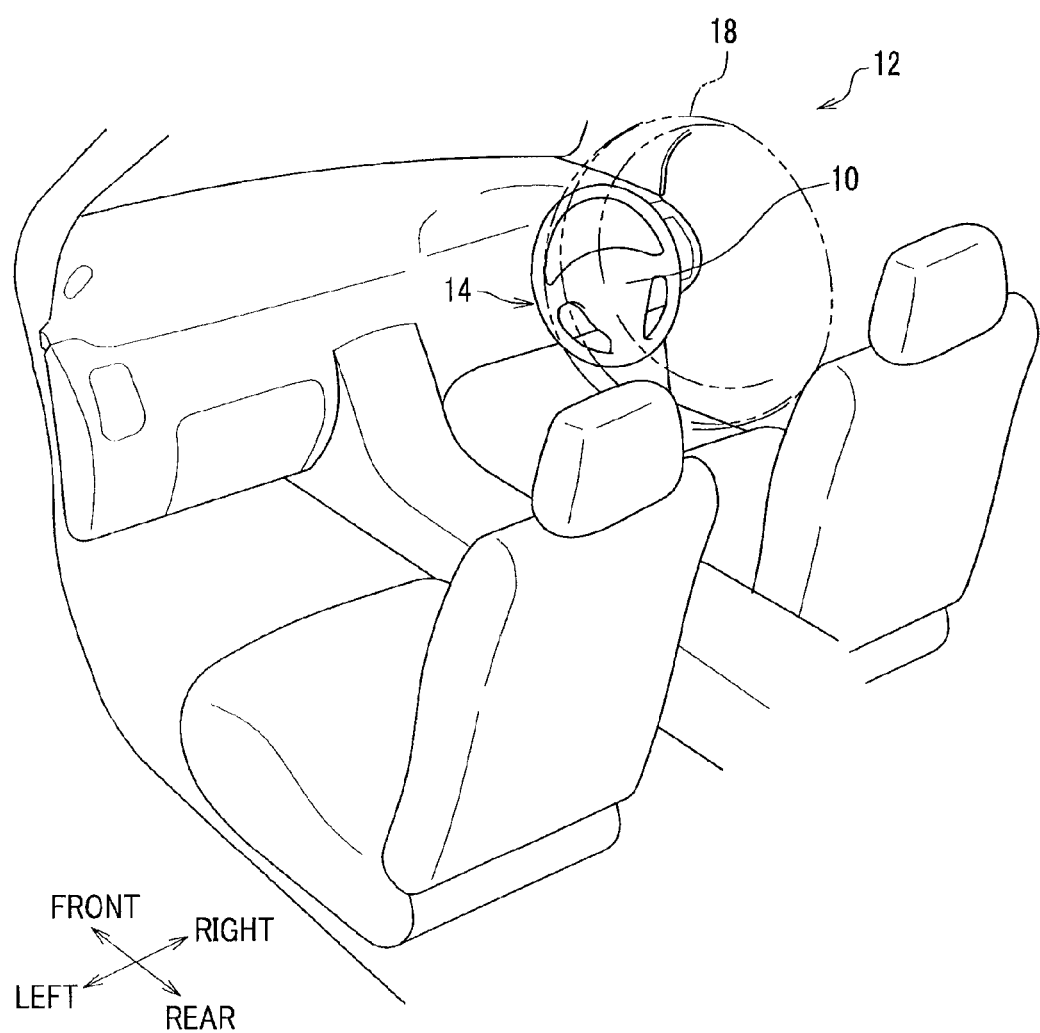
FIG. 1 is a partially enlarged perspective view of a vehicle applied with an air bag system according to an embodiment of the present invention.

With reference to the drawings when necessary, descriptions are provided on the embodiment of the present invention hereinafter. FIG. 1 is a partially enlarged perspective view of a vehicle applied with an air bag system according to the embodiment of the present invention, and FIG. 2 is an exploded perspective view of the air bag system of FIG. 1.

The air bag system (air bag system for a vehicle) 10 according to the embodiment of the present invention is housed inside the steering wheel 14 installed in front of the driving seat. The air bag system 10 expands between the steering wheel 14 and a driver (not shown) to hold and protect the driver when collision energy is applied to the vehicle 12. The embodiment described hereinafter exemplifies the air bag system 10 housed inside the steering wheel 14, but the present invention is not limited to this, and may employ an air bag system of various types such as the air bag system housed inside an instrument panel at a driving seat or a side air bag, etc.

Figure 2:
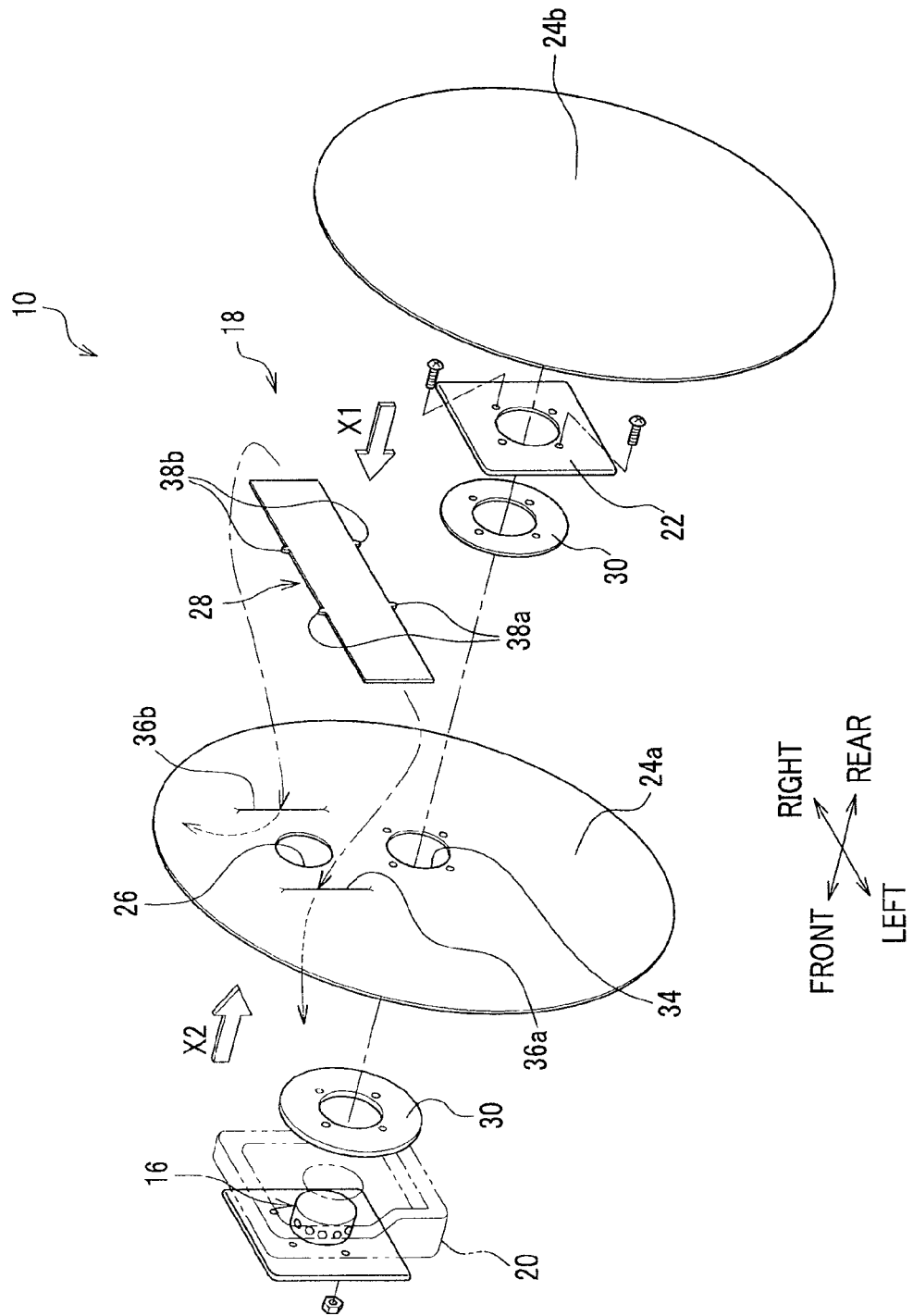
FIG. 2 is an exploded perspective view of the air bag system of FIG. 1.

As shown in FIG. 2, the air bag system 10 includes the inflator 16 that generates high pressure gas, the air bag 18 that is folded and housed inside the steering wheel 14 and inflates with supply of high pressure gas 1) generated by the inflator 16, and the retainer 20 and the fixing plate 22 for fixing the air bag 18 inside the steering wheel 14.

The inflator 16 is installed inside the steering wheel 14 by the retainer 20 and the fixing plate 22, and generates high pressure gas when collision energy is applied to the vehicle 12, and the high pressure gas generated is introduced into the air bag 18.

The air bag 18 includes the first base fabric piece 24a in an approximately circular shape to be positioned on the steering wheel 14 side when the air bag 18 expands (see FIG. 1), the second base fabric piece 24b in an approximately circular shape corresponding to the first base fabric piece 24a to be positioned on the driving seat when the air bag 18 expands, the blocking member 28 in an approximate web shape supported on the first base fabric piece 24a so as to block up the vent hole 26, and the reinforcing seats 30 in an approximate circular shape that reinforce the first fabric piece 24a and the second fabric piece 24b, respectively.

In the above structure, the first fabric piece 24a and the second fabric piece 24b contactedly overlapped are stitched together along the outer circumferential edge thereof to form the circumferential stitched portion 32, which makes the base fabric pieces 24a, 24b a circular bag (see FIG. 3 to FIG. 5 described later).

The inflator insertion hole 34 is formed in the center of the first base fabric piece 24a, and the end of the inflator 16 is inserted through the inflator insertion hole 34 into the inside of the air bag 18, so that high pressure gas generated by the inflator 16 is introduced into the air bag 18.

Figure 3A:
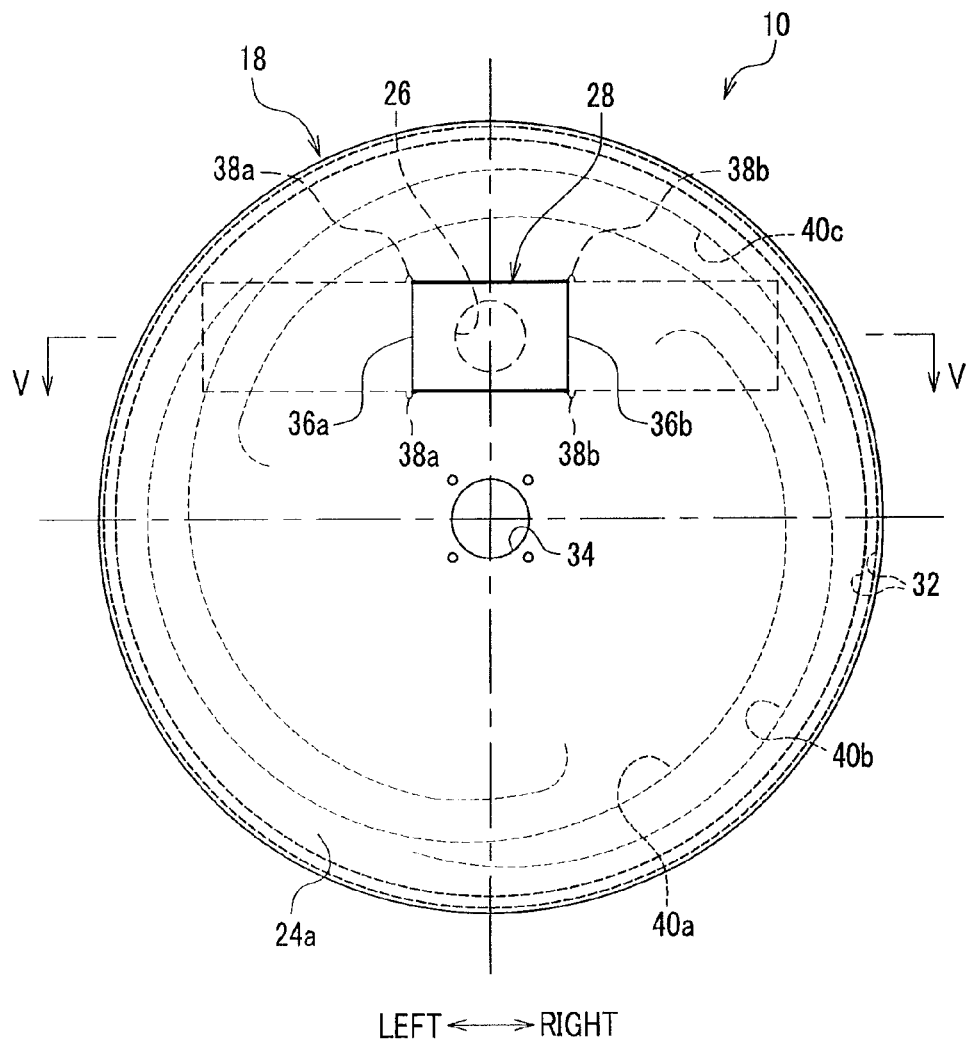
FIG. 3A is a view in the direction of an arrow X1 of FIG. 2.
Figure 3B:
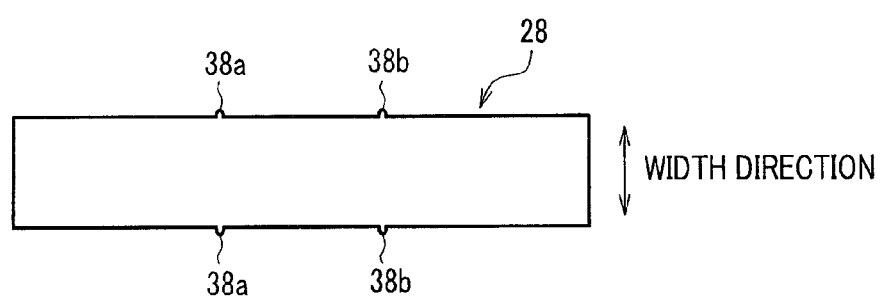
FIG. 3B is a front view of the blocking member.
Figure 4:
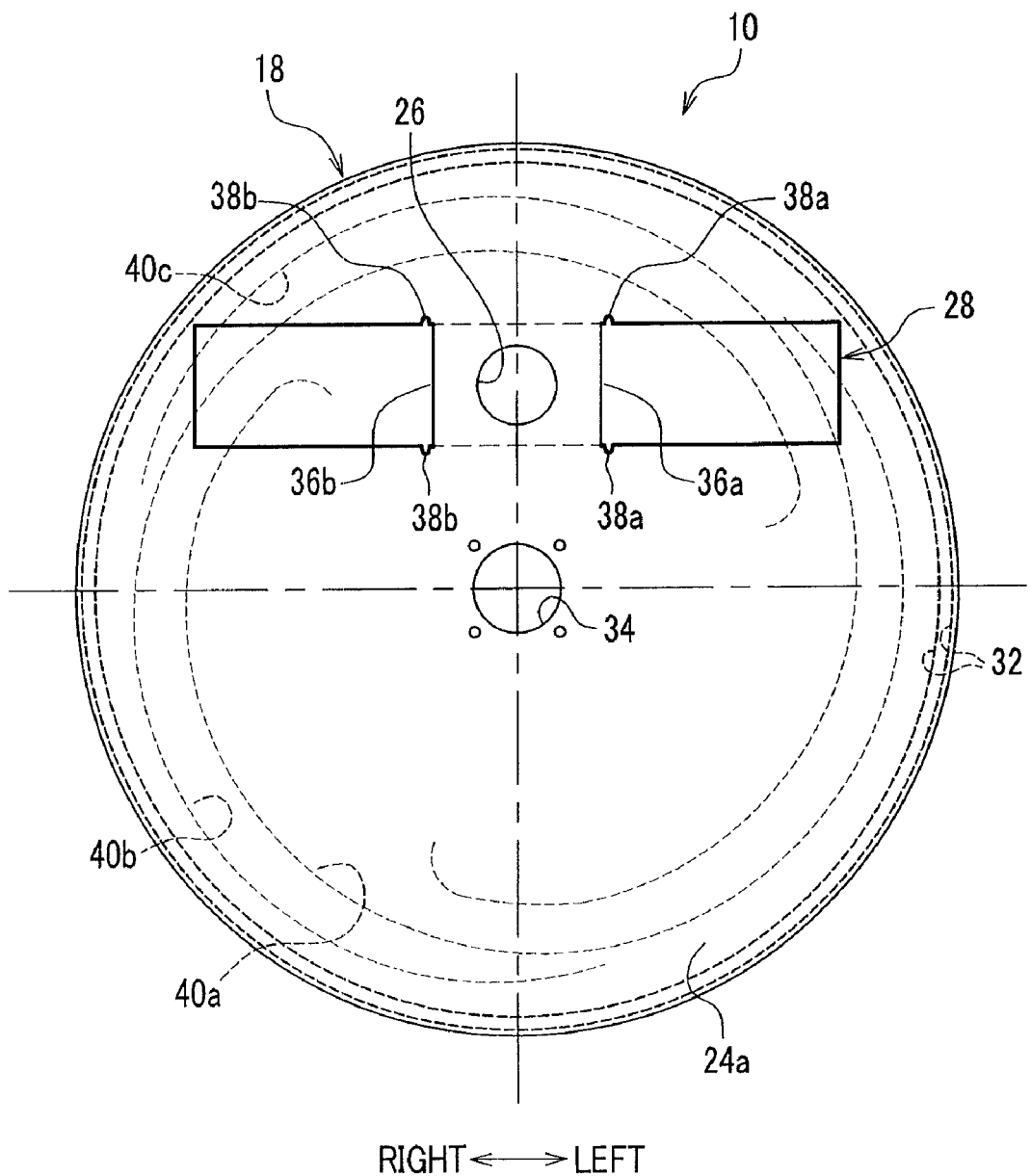
FIG. 4 is a view in the direction of an arrow X2 of FIG. 2.
Figure 5:
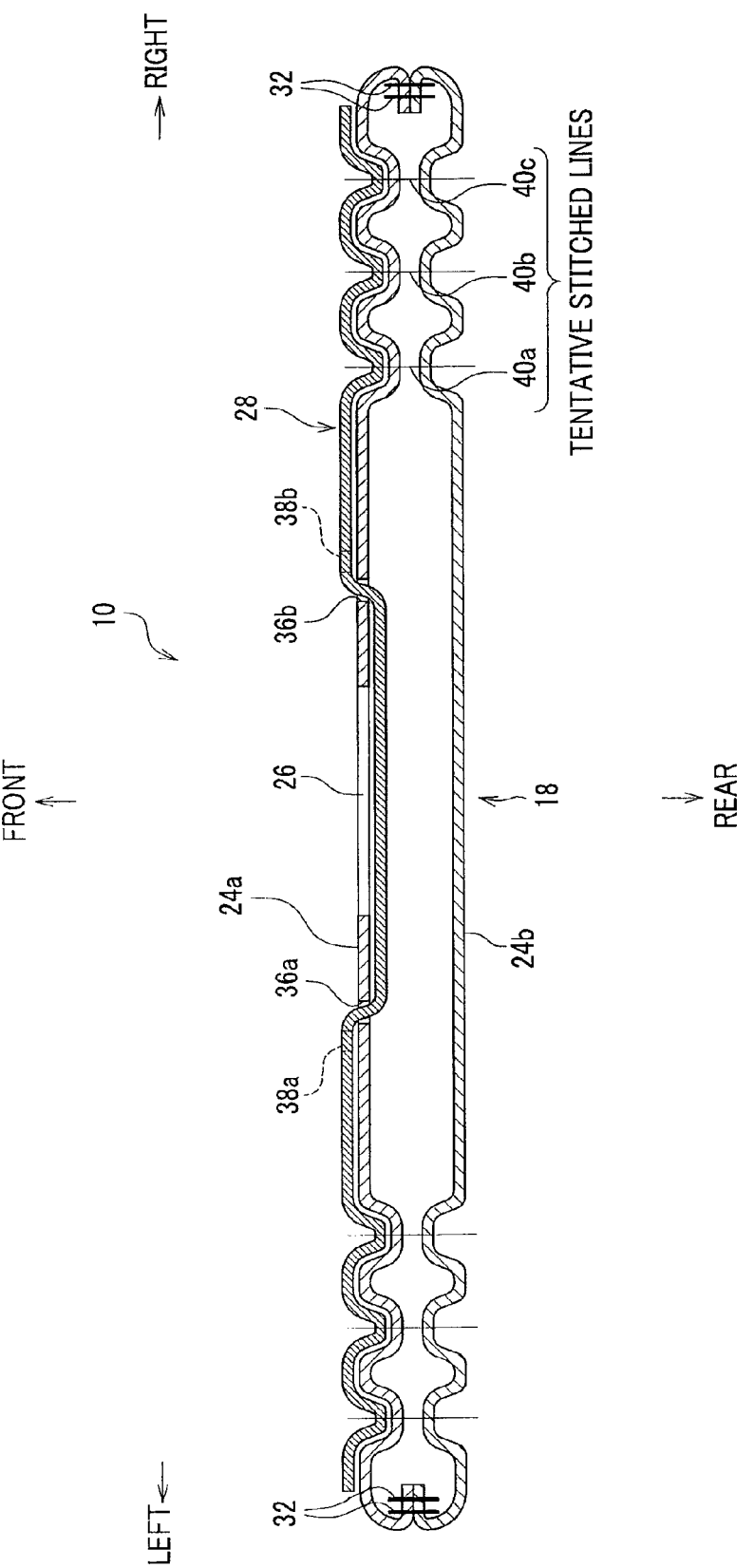
FIG. 5 is an enlarged longitudinal sectional view along a line V-V of FIG. 3A.

FIG. 3A is a view in the direction of the arrow X1 of FIG. 2, FIG. 3B is a front view of the blocking member 28, FIG. 4 is a view in the direction of the arrow X2 of FIG. 2, and FIG. 5 is an enlarged longitudinal sectional view along the line V-V of FIG. 3A.

The vent hole 26 formed in an approximately circular shape is provided at a position radially eccentric from the inflator insertion hole 34 in the center of the first base fabric piece 24a. The shape of the vent hole 26 is not limited to a circular shape, and may be a rectangular, ellipsoidal or long slit shape, or a shape in combination thereof. A pair of slits 36a, 36b in a straight line are provided opposing each other on the right and left sides closer to the vent hole 26.

The blocking member 28 is a web-like body having a laterally long rectangular shape, and a part of (both ends of) the blocking member 28 is inserted through the pair of the slits 36a, 36b from the inside into the outside of the air bag 18 (the first basic fabric piece 24a), as shown in the chain line arrows of FIG. 2.

The shape of the blocking member 28 is not limited to the web-like body in a laterally long rectangular shape as shown in FIG. 2 and FIG. 3B, and may be in a circular, ellipsoidal, rectangular or approximately T shape, or a shape in combination thereof. Reversely, both the ends of the blocking member 28 of the web-like body in a laterally long rectangular shape may be inserted through the pair of the slits 36a, 36b from the outside to the inside of the first base fabric piece 24a.

The length of the pair of the slits 36a, 36b is defined to be slightly greater than the width size of the blocking member 28 in the direction approximately vertical to the longitudinal axial line thereof. The pair of the slits 36a, 36b slidably support the blocking member 28 such that the blocking member 28 unblocks the vent hole 26, serving as the guide portions that restricts the position of the blocking member 28 relative to the vent hole 26.

There are provided a pair of projections 38a, 38b and another pair of projections 38a, 38b formed on the longitudinal upper and lower edges at positions vertical to the longitudinal axial line of the blocking member 28 (direction approximately vertical to the direction where the blocking member 28 slides through the slits 36a, 36b), respectively. Each pair of the projections 38a, 38b are formed to oppose each other in the width direction of the blocking member 28, and the distance between the top of the projection 38a and the top of the projection 38b in the width direction of the blocking member 28 is defined to be greater than the length of the slit 36a and the slit 36b (slit width), respectively.

Specifically, when the blocking member 28 slides to release the inner pressure in the air bag 18 from the vent hole 26, each pair of the projections 38a, 38b of the blocking member 28 engage with the slits 36a, 36b respectively to restrict the sliding movement of the blocking member 28, thereby to increase sliding resistance of the blocking member 28 relative to the first base fabric piece 24a.

Each pair of the projections 38a, 38b serve as a sliding resistance increasing portion to increase the sliding resistance between the guide portions (slits 36a, 36b) and the blocking member 28. The shape of each pair of the projections 38a, 38b is not limited to a curved shape such as an approximately semicircular or semi-ellipse shape, and may have a projecting shape with a sharp angle or a rectangular projection. Each pair of the projections 38a, 38b also function as the step portion in the direction vertical to the sliding direction of the blocking member 28.

As shown in FIG. 4, each pair of the projections 38a, 38b are provided on the blocking member 28 after being inserted through the slits 36a, 36b, and can be seen from the steering wheel 14 side.

The blocking member 28 is formed with the same fabric material as that of the first and second base fabric pieces 24a, 24b, and any material different from that of the first and second base fabric pieces 24a, 24b may be used if the material is flexible.

There are provided on the outer surfaces of the air bag 18 plural stitched lines such as the first to third tentative stitched lines 40a to 40c by contactedly overlapping and stitching together the first base fabric piece 24a, the second base fabric piece 24b and the blocking member 28, as shown in FIGS. 3-5. The first to third tentative stitched lines 40a to 40c are formed in a spiral shape (see FIGS. 3 and 4) from the stitch start point on the radially inner side toward the stitch end point on the radially outer side.

In this state, different from the circumferential stitched portion 32 using a thick string so as not to be broken, the first to third tentative stitched lines 40a to 40c are formed using thin strings such that each of the lines 40a to 40c can be broken off from the first base fabric piece 24a and the second base fabric piece 24b, and arranged with a phase shift at 120 degrees relative to each other.

The air bag system 10 according to the embodiment is as disclosed above, and then descriptions are provided on operational effects thereof hereinafter.

FIG. 6A and FIG. 6B are views explaining the operation of the air bag 18, and FIG. 6A shows the state in which the air bag 18 on the way of the expansion, where the expansion of the air bag 18 is restricted by the first to third tentative stitched lines 40a to 40c, and FIG. 6B shows the state in which the air bag 18 at the terminal stage of the expansion, where, after the first to third tentative stitched lines 40a to 40c are broken off, the blocking member 28 unblocks the vent hole to release the gas.

If the acceleration speed is detected to be greater than the predetermined value at the time of a vehicle collision, the inflator 16 is ignited to generate gas, which is introduced into the air bag 18 folded within the steering wheel 14, so that the air bag 18 inflates and expands toward the vehicle interior.

As shown in FIG. 6A, since the first base fabric piece 24a, the second fabric piece 24b and the blocking member 28 are stitched together with the first to third tentative stitched lines 40a to 40c, the air bag 18 is prevented from expanding at a burst, so as to hold a driver gently. As the inner pressure of the air bag 18 increases, the first to third tentative stitched lines 40a to 40c become sequentially broken off from the inner to outer radial direction of the air bag 18, so that the inner volume of the air bag 18 becomes gradually greater while the inner pressure is maintained at an appropriate level, and eventually the air bag expands in a flat shape in the frontward and backward direction so as to exhibit a maximum holding effect.

The blocking member 28 that blocks up the vent hole is integrally stitched with the first and second base fabric pieces 24a and 24b, so that the blocking member 28 is held onto the air bag 18. Therefore, the vent hole 26 is blocked up with the blocking member 28 to preferably prevent gas leakage until the first to third tentative stitched lines 40a to 40c come all broken off, so that the inner pressure of the air bag 18 can quickly increase and be maintain at an appropriate pressure.

When the first to third tentative stitched lines 40a to 40c are all broken off by the inner pressure of the air bag 18 generated during the expanding, the blocking member 28 is released from its restricted state into its free state, as shown in FIG. 6B, and the blocking member 28 blocking up the vent hole 26 becomes bent at its blocking portion and is pushed outward from the vent hole 26, so that the vent hole 26 becomes unblocked. As a result, excessive gas is discharged from the vent hole 26 to the exterior of the air bag, so that an excessive rise of the inner pressure of the air bag 18 can be prevented.

Accordingly, as the first to third tentative stitched lines 40a to 40c sequentially become broken off from the inner to the outer radial direction, the inner volume of the air bag 18 becomes greater, thereby to regulatinq the inner pressure of the air bag 18.

In the embodiment, when the blocking member 28 is released from the restricted state into the free state, the projections 38a, 38b engage with the edges of the slits 36a, 36b respectively, generating a sliding resistance in the direction to prevent the blocking member 28 from sliding, thereby to restricting the portion of the blocking member 28 blocking up the vent hole 26 to be pushed outward from the vent hole 26.

Specifically, when the blocking member 28 becomes released into the free state from the tentative stitched portions 40a to 40c through which the blocking member 28 is stitched together with the air bag 18, the blocking member 28 comes apart from the vent hole 26 just for a moment, so that the gas may flow out through a gap between the vent hole 26 and the blocking member 28. In other words, at the initial stage of the expansion of the air hag 18, the blocking member 28 comes apart from the air bag 18 and may unblock the vent hole 26, which means that the blocking member 28 comes apart from the vent hole 26 just for a moment, and the gas inside the air bag 18 may leak before the inner pressure in the air bag 18 becomes released.

However, in the embodiment, after the blocking member 28 that blocks up the vent hole 26 becomes in the free state and before the inner pressure of the air bag 18 is released, the edges of the slits 36a, 36b engage with two pairs of the projections 38a, 38b, respectively, so as to increase the sliding resistance of the blocking member 28 in the sliding direction, so that the blocked state of the vent hole 16 can be maintained temporarily to prevent the instantaneous gas leakage.

As a result, according to the embodiment, it is possible to preferably prevent a drastic pressure change (pressure change A of the characteristic curve indicated by the broken line of FIG. 8, described later) that affects the holding effect for a holding vehicle occupant, which is caused by instantaneous inner pressure release.

Detailed descriptions will be provided with reference to FIG. 7A to FIG. 7D hereinafter.

Figure 8:
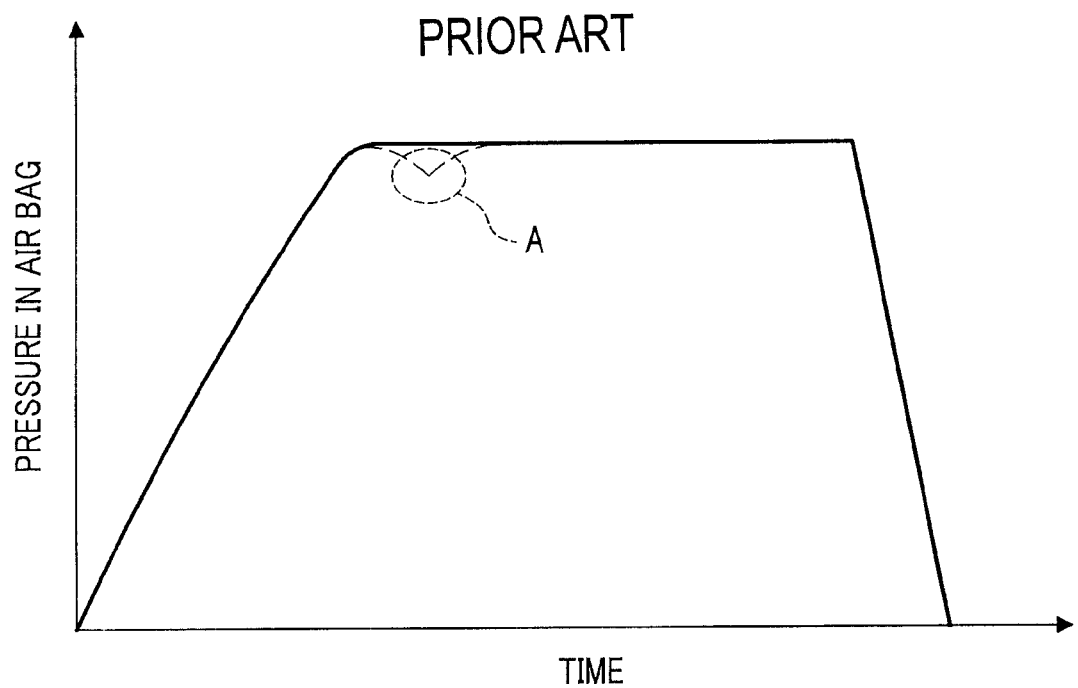
FIG. 8 is a characteristic view showing a relation between change of the inner pressure in the air bag and time.

FIG. 7A is a partially broken perspective view showing that the blocking member 28 is in the restricted and free state, FIG. 7B is a partially broken perspective view showing that the blocking member 28 is released from the restricted state and becomes in the free state, FIG. 7C is a partially broken perspective view showing the state where the pairs of the projections 38a, 38b engage with the slits 36a, 36b, respectively, FIG. 7D is a partially broken perspective view showing that the blocking member 28 is pushed outward from the vent hole 26 so that the vent hole 26 becomes in the released state, and FIG. 8 is a characteristic view showing a relation betvveen the change of the inner pressure of the air bag 18 and time.

Since the blocking member 28 is stitched together with the first and second base fabric pieces 24a, 24b by the first to second tentative stitched lines 40a to 40c, when the blocking member 28 for blocking up the vent hole 26 is in the restricted state, the blocking member 28 is tensed such that the blocking member 28 is slightly stretched in the arrow direction by the tensile stress, as shown in FIG. 7A. Then, when the first to third tentative stitched lines 40a to 40c sequentially are broken off so that the blocking member 28 for blocking up the vent hole 26 is in the free state, the blocking member 28 that has been tensed in the tense state then starts to come loose (shrink) as shown in FIG. 7B, and the pairs of the projections 38a, 38b move toward the slits 36a, 36b, respectively.

Then, as shown in FIG. 7C, the pairs of the projections 38a, 38b provided on the upper and the lower edges of the blocking member 28 engage with the edges of the slits 36a, 36b, respectively so that the sliding resistance increases, serving to prevent the blocking member 28 from further sliding in the direction to come loose and shrink, so that the blocking member 28 is restricted to release the vent hole 26. As a result, the longer the time while the pair of the projections 38a, 38b of the blocking member 28 is engaging with the edges of the slits 36a, 36b becomes, the longer the time while the vent hole 26 is being blocked up becomes (the inner pressure retaining time increases (comes extended)).

As shown in FIG. 7D, after the pairs of the projections 38a, 38b provided on the blocking member 28 deform and pass through the slits 36a, 36b, the part of the blocking member 28 that blocks up the vent hole 26 is pushed outward from the vent hole 26 by the inner pressure of the air bag 18, so that the vent hole 26 is uncovered or released, and then the gas in the air bag 18 flows out from the uncovered vent hole 26.

In the prior art, as indicated by the characteristic curve in the broken line of FIG. 8, right before the blocking member 28 is in the free state during the expansion of the air bag 18 and opens the vent hole 26, the blocking member 28 comes apart from the vent hole 26 just for a moment and the gas in the air bag 18 is leaked, so that the pressure change A in the characteristic curve occurs because the inner pressure of the air bag 18 temporarily becomes lowered.

To the contrary, in the present embodiment, the pairs of the projections 38a, 38b of the blocking member 28 engage with the edges of the slits 36a, 36b so as to prevent the instantaneous gas leakage at the initial stage of the expansion of the air bag 18, thereby reducing the pressure change A in the characteristic curve; accordingly the inner pressure of the air bag 18 can be approximately even in a stable manner, as indicated by the characteristic curve in the solid line of FIG. 8B.

As described above, the present embodiment slightly extends the time period until the inner pressure in the air bag 18 is released right after the blocking member 28 becomes in the free state (i.e. the time while the inner pressure of the air bag 18 is being retained becomes slightly longer), so that the time period while an occupant is held by the air bag 18 can be longer; accordingly the occupant protection effect can be enhanced much more.

Next, FIG. 9 to FIG. 12 show the air bag system 10a according to the first variation of the embodiment of the present invention. In this first variation described hereinafter, the same numerical references are used for the same components, and detailed descriptions will be omitted.

Figure 9A:
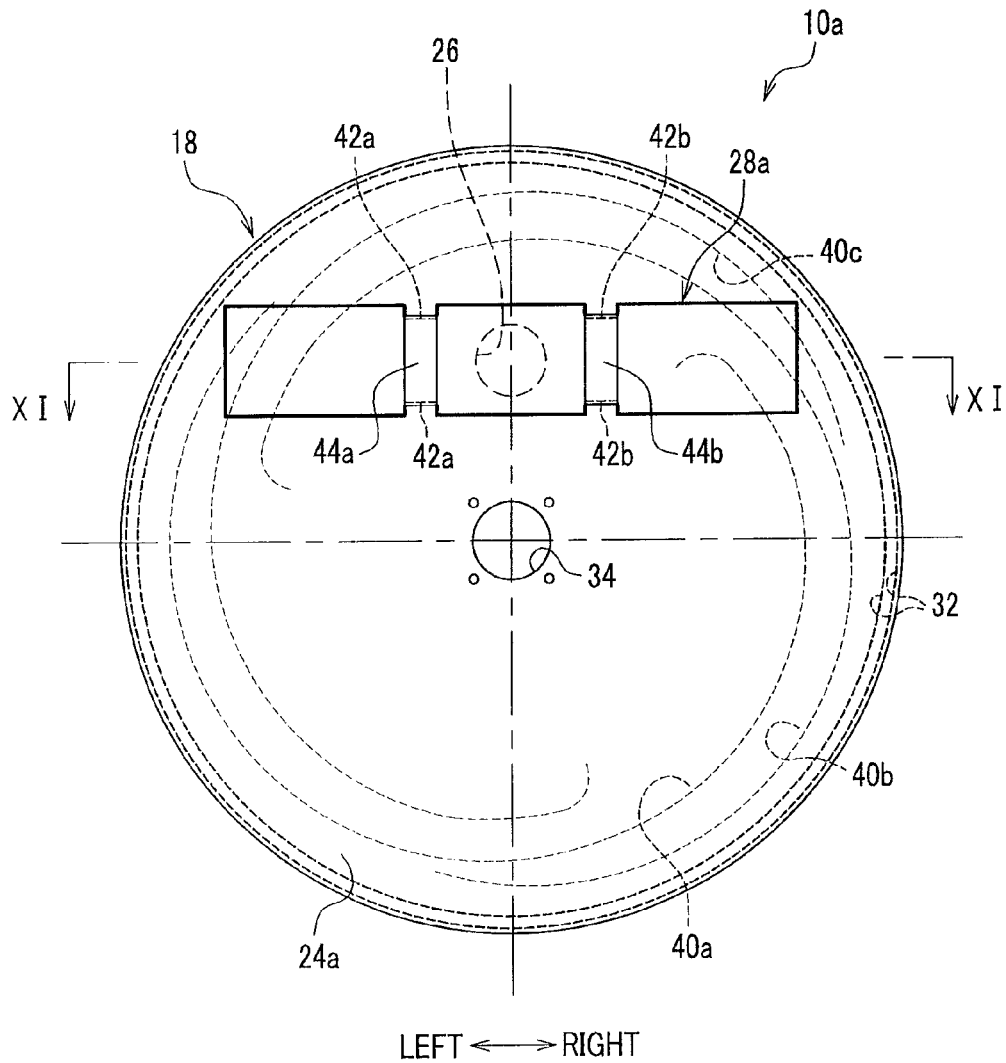
FIG. 9A is a view corresponding to FIG. 3, showing the air bag system according to a first variation of the embodiment of the present invention.
Figure 9B:
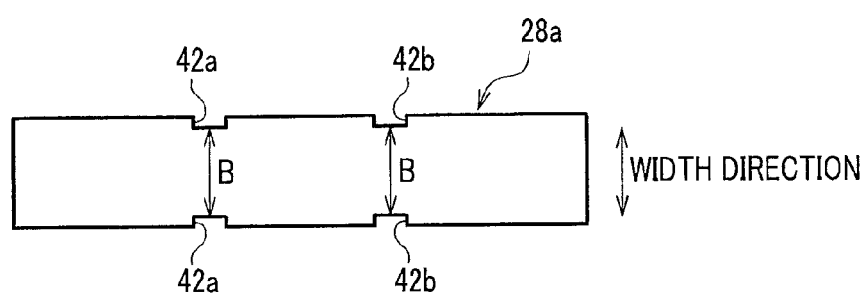
FIG. 9B is a front elevation view of the blocking member.

FIG. 9A is a view on arrow corresponding to FIG. 3, showing the air bag system 10a according to the first variation of the embodiment of the present invention, FIG. 9B is a front elevation view of the blocking member 28a, FIG. 10 is a view on arrow corresponding to FIG. 4, showing the air bag system 10*a* according to the first variation of the embodiment of the present invention, FIG. 11A is an enlarged longitudinal sectional view along the line XI-XI of FIG. 9A, and FIG. 11B is an enlarged longitudinal sectional view of an applied example of the air bag system 10*a* according to the first variation of the embodiment.

In this first variation, there are provided two pairs of the rectangular recess portions 42*a*, 42*b* on the longitudinal upper and lower edges of the blocking member 28*a*, respectively, and each pair of the rectangular portions 42*a*, 42*b* oppose each other in the width direction of the blocking member 28*a*. A pair of the guide straps 44*a*, 44*b* for slidably supporting the blocking member 28*a* are stitched and fixed on the inner face of the first fabric piece 24*a*. The width size of the insertion portion of the pair of the guide straps 44*a*, 44*b* that slidably supports the blocking member 28*a* is approximately equal to or slightly wider than the width size B (see FIG. 9B) between each pair of the rectangular recess portions 42*a*, 42*a* (42*b*, 42*b*). The guide straps 44*a*, 44*b* may be fixed (to adhere) to the first fabric piece 24*a* with adhesive.

The pair of the rectangular recess portions 42*a*, 42*b* function as the sliding resistance increasing portion that increases sliding resistance between the guide portions (i.e. guide straps 44*a*, 44*b*) and the blocking member 28*a*. The recessed shape of the rectangular portions 42*a*, 42*b* is not limited to a rectangular shape, and a curved shape including an approximately semicircular or approximately ellipsoidal shape, or a triangular shape may be applicable to this invention. The pair of the rectangular recess portions 42*a*, 42*b* also function as the step portion formed in the direction vertical to the sliding direction of the blocking member 28.

In this variation, when the blocking member 28*a* comes in the free state, the pairs of the rectangular recess portions 42*a*, 42*b* of the blocking member 28*a* easily and securely engage with the pair of the guide straps 44*a*, 44*b*, thereby increasing the sliding resistance and maintaining the blocked state of the vent hole 26 so as to prevent instantaneous gas leakage.

In this first variation, the pair of the guide straps 44*a*, 44*b* support the blocking member 28*a* on the inner face of the base fabric piece 24*a*, and as shown in the applied example of the embodiment of FIG. 11B, the pair of the guide straps 44*a*, 44*b* may be stitched on the outer face of the first base fabric piece 24*a* (air bag 18), and the blocking member 28*a* may be provided on the outer face of the first base fabric piece 24*a* (air bag 18) with slidably supported by the pair of the guide straps 44*a*, 44*b*.

Figure 13:
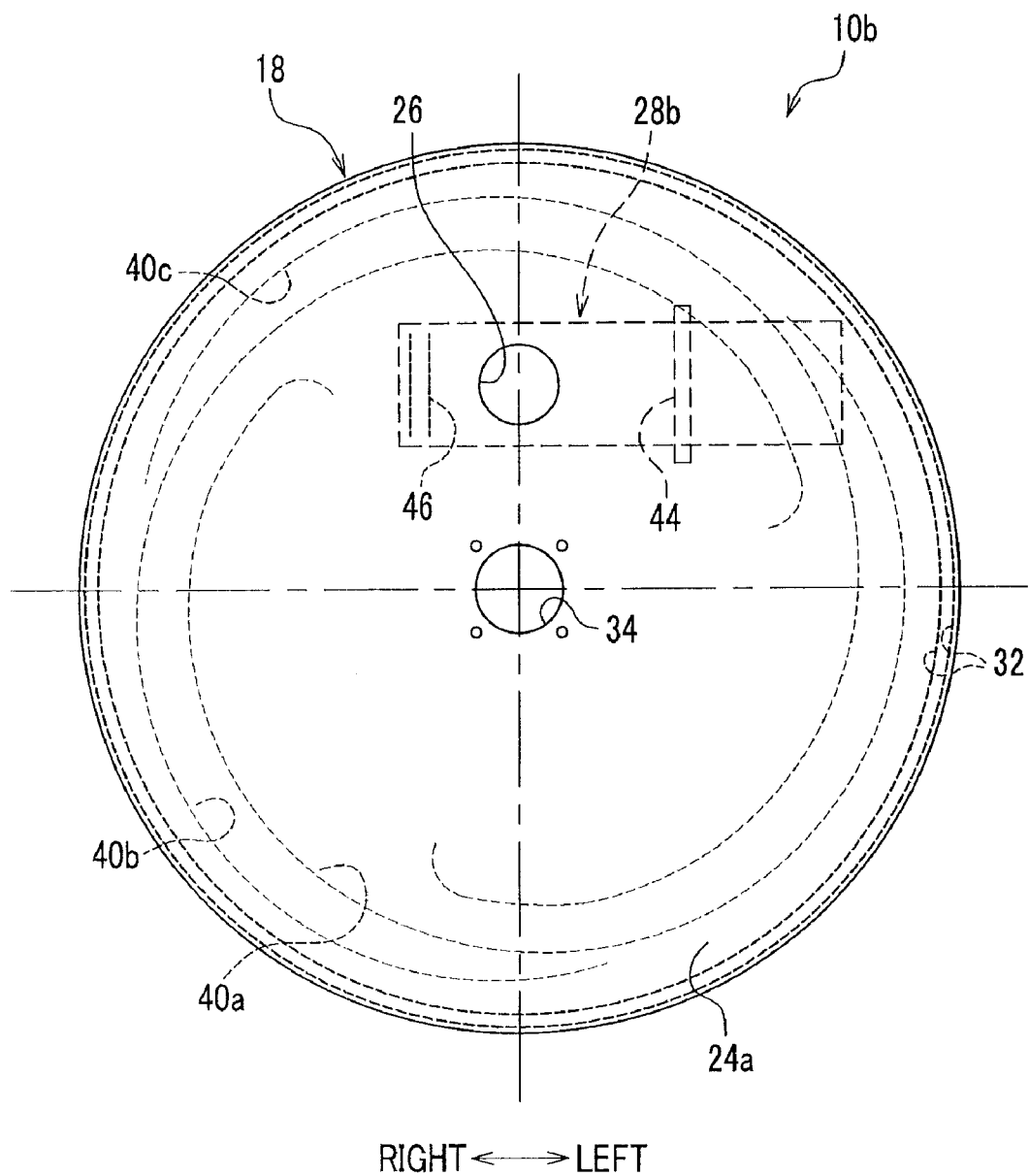
FIG. 13 is a view corresponding to FIG. 4, showing the air bag system according to the second variation of the embodiment of the present invention.

Next, FIG. 12 to FIG. 14 show the air bag system 10*b* according to the second variation of the embodiment of the present invention.

Figure 15:
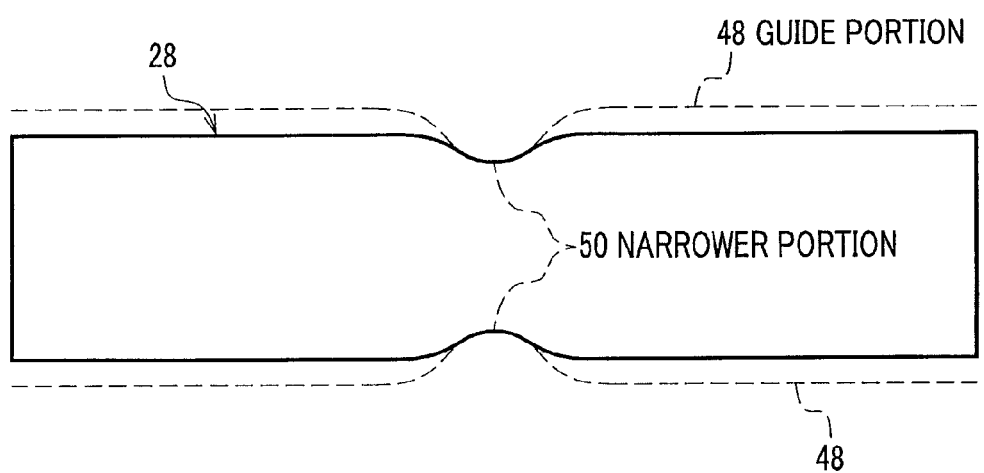
FIG. 15 is a side sectional view of a variation of the sliding resistance increasing portion having narrower portions on the guide portions.

FIG. 12 is a view corresponding to FIG. 3, showing the air bag system 10*b* according to the second variation of the embodiment of the present invention, FIG. 13 is a view corresponding to FIG. 4, showing the air bag system 10*b* according to the second variation of the embodiment of the present invention, FIG. 14A is an enlarged longitudinal sectional view along the line XIV-XIV of FIG. 12, FIG. 14B is an enlarged longitudinal sectional view of an applied example of the air bag system 10*b* according to the first variation of the embodiment, and FIG. 15 is a side sectional view of a variation of the sliding resistance increasing portion having narrower portions for the guide portions.

In this second variation of the embodiment of the present invention, as shown in FIG. 12 and FIG. 14A, one width end of the blocking member 28*b* in a rectangular shape with a constant width is stitched and fixed by the fixing stitched lines 46 onto the inner face of the first base fabric piece 24*a*, and each end of the single guide strap (guide portion) 44 is stitched to the first base fabric piece 24*a*, so that only the other end opposing the one end of the blocking member 28*b* stitched by the stitched lines 46 is slidably supported by the guide portion, which is different from the above first variation.

Specifically, in the embodiment as shown in FIG. 2 to FIG. 8 and in the first variation as shown in FIG. 9 to FIG. 11, there are provided a plurality of the guide portions (pair of the slits 36*a*, 36*b*, pair of the guide straps 44*a*, 44*b*) and a plurality of the sliding resistance increasing portions (pair of the projections 38*a*, 38*b*, pair of the rectangular recess portions 42*a*, 42*b*), between which the vent hole 26 is positioned. To the contrary, in the second variation of the embodiment, the one end of the blocking member 28*b* is fixed on the first base fabric piece 24*a* by the fixing stitched lines 46, and the other end of the blocking member 28*b* is tentatively stitched by the first to third tentative stitched lines 40*a* to 40*c* to be broken easily, so that the blocking member 28*b* only at the other end thereof is slidably supported by the single guide strap 44, which is different from the embodiment and the above first variation of the embodiment.

In addition, the insertion portion of this single guide strap 44, where the blocking member 28*b* is slidably supported, has a width size smaller than the width size of the blocking member 28*b* so that, when sliding, the blocking member 28*b* generates a sliding resistance between the guide strap 44 and the blocking member 28*b*. Such a single strap 44 has a function as the guide portion for slidably supporting the blocking member 28*b* as well as a function as the sliding resistance increasing portion for increasing the sliding resistance between the guide portion and the blocking member 28.

In the second variation, the single guide strap 44 supports the blocking member 28 on the inner face of the first fabric piece 24*a*, and may be stitched onto the outer face of the first fabric piece 24*a* (air bag 18) so that the blocking member 28*b* may be placed on the outer face of the first base fabric piece 24*a* (air bag 18) with slidably supported by the guide strap 44, as shown in FIG. 14B, for example.

In the present embodiment including the various variations, the pair of the slits 36*a*, 36*b* and the guide straps 44 (44*a*, 44*b*) that are stitched on the first base fabric piece 24*a*, etc., slidably support the blocking member 28 (28*a*, 28*b*4) so that the blocking member 28 can unblock the vent hole 26. As shown in FIG. 15, for example, the guide portion 48 may be formed such that there is provided a narrower portion 50 having a narrower distance between the upper and lower edges of the blocking member 28 and the blocking member 28 than the other portions of the guide portion 48, so that this narrower portion 50 is engaged with the upper and lower edges of the blocking member 28 to increase the sliding resistance therebetween. In this case, this narrower portion 50 functions as the sliding resistance increasing portion.

Alternatively, the sliding resistance may be increased such that the pair of the slits 36*a*, 36*b* are formed to have a slit width narrower than that of the blocking member 28, so that sliding of the blocking member 28 can be restricted so as to increase the sliding resistance.

The present invention provides an air bag system for a vehicle that can retain the blocking state of the vent hole and prevent the instantaneous gas leakage after the blocking member that blocks up the vent hole comes into the free state and before the inner pressure of the air bag is released.

The embodiment thereof according to the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. An air bag system for a vehicle comprising an air bag in a folded state and installed in a vehicle, the air bag inflating and expanding by a gas supply, and an inflator introducing gas into the air bag, the air bag system further comprising:
a vent hole provided on one base fabric piece of the air bag so as to establish a communication path between an inside and an outside of the air bag through which gas may be discharged from the inside toward the outside of the air bag;
an inflator insertion hole defined in a center of said one base fabric piece and through which said inflator extends so as to introduce gas into the air bag, said vent hole being spaced in a radial direction outwardly from said inflator insertion hole;
a blocking member spaced from said inflator insertion hole and supported on the base fabric piece to block up the vent hole, said blocking member having a length direction extending generally transverse to the radial direction and laterally away from said the vent hole, whereby a center portion of said blocking member overlies said vent hole on a first side of said base fabric piece while first and second opposed ends of said blocking member are spaced from said vent hole and said inflator insertion hole and disposed on a second, opposite side of said base fabric piece;
at least one guide portion for slidably supporting the blocking member and restricting a position of the blocking member relative to the vent hole; and
at least one sliding resistance increasing portion provided on at least one of the guide portion and the blocking member, so as to increase a sliding resistance between the guide portion and the blocking member when the blocking member slides.

2. The air bag system as set forth in the claim 1, wherein the sliding resistance increasing portion comprises a step portion formed in a direction perpendicular to a sliding direction of the blocking member.

3. The air bag system as set forth in the claim 1, wherein
one of said first and second ends of the blocking member is tentatively stitched onto the base fabric piece by at least one tentative stitched line that is adapted to be broken off,
the guide portion is disposed between said one of said first and second ends of the blocking member and the vent hole, and
the tentative stitched line is broken off during expansion of the air bag, so as to release the blocking member from a restricted state.

4. The air bag system as set forth in the claim 2, wherein
one of said first and second ends of the blocking member is tentatively stitched onto the base fabric piece by at least one tentative stitched line that is adapted to be broken off,
the guide portion is disposed between said one of said first and second ends of the blocking member and the vent hole, and
the tentative stitched line is broken off during expansion of the air bag, so as to release the blocking member from a restricted state.

5. The air bag system as set forth in the claim 1, wherein first and second guide portions and first and second sliding resistance increasing portions are provided, with the first guide portion and first sliding resistance increasing portion being on a first side of said vent hole and the second guide portion and second sliding resistance increasing portion being on a second side of said vent hole.

6. The air bag system as set forth in the claim 2, wherein first and second guide portions and first and second sliding resistance increasing portions are provided, with the first guide portion and first sliding resistance increasing portion being on a first side of said vent hole and the second guide portion and second sliding resistance increasing portion being on a second side of said vent hole.

7. The air bag system as set forth in the claim 3, wherein first and second guide portions and first and second sliding resistance increasing portions are provided, with the first guide portion and first sliding resistance increasing portion being on a first side of said vent hole and the second guide portion and second sliding resistance increasing portion being on a second side of said vent hole.

8. The air bag system as set forth in the claim 4, wherein first and second guide portions and first and second sliding resistance increasing portions are provided, with the first guide portion and first sliding resistance increasing portion being on a first side of said vent hole and the second guide portion and second sliding resistance increasing portion being on a second side of said vent hole.

9. The air bag system as set forth in the claim 1, wherein
each of said first and second ends of the blocking member is tentatively stitched onto the base fabric piece by a tentative stitched line that is adapted to be broken off such that the blocking member is supported on the base fabric piece to block up the vent hole,
said at least one guide portion includes a first guide portion disposed between said first end of the blocking member and the vent hole and a second guide portion disposed between said second end of the blocking member and the vent hole, and
the tentative stitched line is broken off during expansion of the air bag, so as to release the blocking member from a restricted state.

10. An air bag system for a vehicle comprising an air bag in a folded state and installed in a vehicle, the air bag inflating and expanding by a gas supply, and an inflator introducing gas into the air bag, the air bag system further comprising:
a vent hole provided on one base fabric piece of the air bag so as to establish a communication path between an inside and an outside of the air bag through which gas may be discharged from the inside toward the outside of the air bag;
a blocking member supported on the base fabric piece to block up the vent hole, said blocking member having a central portion and first and second opposite ends, said central portion of said blocking member being disposed over said vent hole while said first and second ends extend away from said vent hole;
first and second guide portions for slidably supporting the blocking member and restricting a position of the blocking member relative to the vent hole, said first guide portion slidably receiving said first end of said blocking member on a first side of said vent hole while said second guide portion slidably receives said second end of said blocking member on a second side of said vent hole; and first and second sliding resistance increasing portions, said first sliding resistance increasing portion being provided on said first end of said blocking member and engaging said first guide portion, said second sliding resistance increasing portion being provided on said second end of said blocking member and engaging said second guide portion, wherein said first and second sliding resistance increasing portions cooperating to increase a sliding resistance between the guide portions and the blocking member when the blocking member slides.

11. The air bag system as set forth in the claim 10, wherein at least one of the sliding resistance increasing portions comprises a step portion formed in a direction perpendicular to a sliding direction of the blocking member.

12. The air bag system as set forth in the claim 10, wherein each end of the blocking member is tentatively stitched onto the base fabric piece by a tentative stitched line that is adapted to be broken off,
the tentative stitched line is broken off during expansion of the air bag, so as to release the blocking member from a restricted state.

13. The air bag system as set forth in the claim 11, wherein each end of the blocking member is tentatively stitched onto the base fabric piece by a tentative stitched line that is adapted to be broken off,
the tentative stitched line is broken off during expansion of the air bag, so as to release the blocking member from a restricted state.

14. The air bag system as set forth in claim 10, wherein the first guide portion is defined by a first slit formed in the base fabric piece on a first side of the vent hole and the second guide portion is defined by a second slit formed in the base fabric piece on a second side of the vent hole, wherein a length of the first slit is chosen so as to allow said first end of the blocking member to slide therethrough while a length of the second slit is chosen so as to allow said second end of the blocking member to slide therethrough.

15. The air bag system as set forth in claim 14, wherein said first sliding resistance increasing portion comprises projections formed on opposite edges of said first end of the blocking member and extending in a direction perpendicular to a length of the blocking member while said second sliding resistance increasing portion comprises projections formed on opposite edges of said second end of the blocking member and extending in the direction perpendicular to the length of the blocking member, said first and second sliding resistance increasing portions engaging the base fabric piece adjacent the first and second slits, respectively, as said blocking member slides to thereby increase sliding resistance of the blocking member relative to the base fabric piece.

* * * * *